(12) United States Patent
Roberts et al.

(10) Patent No.: US 8,517,331 B2
(45) Date of Patent: Aug. 27, 2013

(54) FENDER MOUNT FOR MIRROR

(75) Inventors: Thomas L. Roberts, Mukwonago, WI (US); Jeffery R. Porter, Mequon, WI (US)

(73) Assignee: Velvac Incorporated, New Berlin, WI (US)

( * ) Notice: Subject to any disclaimer, the term of this patent is extended or adjusted under 35 U.S.C. 154(b) by 375 days.

(21) Appl. No.: 12/783,035

(22) Filed: May 19, 2010

(65) Prior Publication Data

US 2011/0284715 A1  Nov. 24, 2011

(51) Int. Cl.
| | |
|---|---|
| A47G 1/24 | (2006.01) |
| A47G 1/16 | (2006.01) |
| B60R 1/02 | (2006.01) |
| A47F 7/14 | (2006.01) |
| G02B 5/08 | (2006.01) |
| G02B 7/18 | (2006.01) |
| G02B 5/10 | (2006.01) |

(52) U.S. Cl.
USPC ........ 248/479; 248/480; 248/475.1; 248/476; 359/841; 359/850; 359/871; 359/872

(58) Field of Classification Search
USPC .............. 248/479, 480, 475.1, 476; 359/841, 359/850, 871, 872
See application file for complete search history.

(56) References Cited

U.S. PATENT DOCUMENTS

| | | |
|---|---|---|
| 3,081,057 A | 3/1963 | Farnsworth |
| 3,482,811 A | 12/1969 | Zent |
| 3,729,163 A * | 4/1973 | Cummins ..................... 248/487 |
| 3,831,896 A | 8/1974 | Owens |

(Continued)

FOREIGN PATENT DOCUMENTS

| | | |
|---|---|---|
| EP | 0094187 A2 | 11/1983 |
| JP | 41-1693 | 2/1976 |

OTHER PUBLICATIONS

Community Transportation, (2002), including the cover page of Community Transportation magazine dated 2002 (p. 1 of 3), an advertisement at p. 37 of the magazine with a photograph of the Starcraft Bus including the asserted mirror mounting assembly (p. 2 of 3), and an additional photograph of a portion of the Starcraft Bus to better show the details of the support member of the mirror mounting assembly (p. 3 of 3).

(Continued)

Primary Examiner — Terrell McKinnon
Assistant Examiner — Christopher Garft
(74) Attorney, Agent, or Firm — Schiff Hardin LLP

(57) ABSTRACT

A mirror mount includes a one-piece molecularly continuous base member and a mirror arm. The mirror arm fastens a mirror to the base member. The base member may also have first and second ends, a side portion, and a reinforcement. The side portion extends between the first and second ends. The first end is generally vertical when the base member is affixed to a fender, and the first end receives a generally horizontal fastener that passes through the first end, through two portions of the fender, and into the base member so as to fasten the base member to the fender. The side portion has a contour that generally follows a profile of the fender. The reinforcement reinforces the first end.

15 Claims, 11 Drawing Sheets

(56) References Cited

U.S. PATENT DOCUMENTS

| | | | | |
|---|---|---|---|---|
| 4,789,232 A * | 12/1988 | Urbanek | | 248/549 |
| 4,793,582 A * | 12/1988 | Bronstein et al. | | 248/486 |
| 5,433,417 A | 7/1995 | Schmidt et al. | | |
| 5,576,899 A * | 11/1996 | Englander | | 359/871 |
| 5,639,054 A * | 6/1997 | Gerndt et al. | | 248/478 |
| 6,012,819 A * | 1/2000 | Pai | | 359/855 |
| 6,017,126 A * | 1/2000 | Matsuura et al. | | 359/872 |
| 6,171,540 B1 * | 1/2001 | Ibaragi | | 264/328.1 |
| 7,036,945 B2 * | 5/2006 | Sakata | | 359/841 |
| 7,055,973 B2 | 6/2006 | Englander | | |
| 7,210,800 B2 | 5/2007 | Englander | | |
| 7,252,398 B2 * | 8/2007 | Englander | | 359/841 |
| 7,290,891 B2 * | 11/2007 | Englander | | 359/841 |
| 7,452,088 B2 * | 11/2008 | Brester et al. | | 359/841 |
| 7,490,945 B2 * | 2/2009 | Proctor | | 359/841 |
| 7,530,537 B2 * | 5/2009 | Kandah | | 248/99 |
| 7,717,576 B2 | 5/2010 | Englander | | |
| 2008/0128565 A1 * | 6/2008 | Kandah | | 248/100 |
| 2008/0253006 A1 | 10/2008 | Englander | | |
| 2008/0265122 A1 * | 10/2008 | Branham | | 248/479 |

OTHER PUBLICATIONS

Community Transportation, (Jan./Feb. 2001), including the cover page of Community Transportation magazine dated Jan./Feb. 2001 (p. 1 of 4), an advertisement at p. 19 of the magazine with a photograph of the Glaval Bus including the asserted mirror mounting assembly (p. 2 of 4), an additional photograph of the Glaval Bus appearing on p. 19 of the magazine (p. 3 of 4), and an additional photograph of a portion of the Glaval Bus to better show the details of the support member of the mirror mounting assembly (p. 4 of 4).

Community Transportation, (2002), including the cover page of Community Transportation magazine dated 2002 (p. 1 of 3), an advertisement at p. 47 of the magazine with a photograph of the MetroLite van including the asserted mirror mounting assembly (p. 2 of 3), and an additional photograph of a portion of the MetroLite van to better show the details of the support member of the mirror mounting assembly (p. 3 of 3).

* cited by examiner

FENDER MOUNT FOR MIRROR

TECHNICAL FIELD

The apparatus disclosed herein relates to a mirror mount such as mirror mount that mounts a mirror to the fender of a vehicle.

BACKGROUND

Mirrors mounted on fenders of vehicles such as buses and trucks are well known. These mirrors are typically mounted using a plurality of mirror support arms that form a mounting frame in which some of the arms in the frame are fastened to the fender of the vehicle and some of the arms in the frame are fastened to the mirror.

It is also known to mount a mirror to the fender of a vehicle using a base member that is clamped to the vehicle at the fender. The base member is generally in the shape of an L that wraps around or hugs the exterior of the fender. A bracket has a first end that is fastened such as by screws or bolts to the upper portion of the base member and a second end that extends under the hood of the vehicle to clamp the upper portion of the base member to the vehicle. Straps clamp the lower portion of the base member to the vehicle such as by use of the wheel well.

As is obvious, the second end of the bracket can be bolted or screwed to the vehicle frame under the hood in order to add strength to this mount. It is also known to bolt or screw the lower portion of the base member to the fender.

These mounting arrangements lack sufficient stiffness for a rugged and stable mirror mount. They also lack strength and do not add to fender stability and driver visibility.

The present invention overcomes one or more of these or other problems.

DETAILED DESCRIPTION

Figure 1:
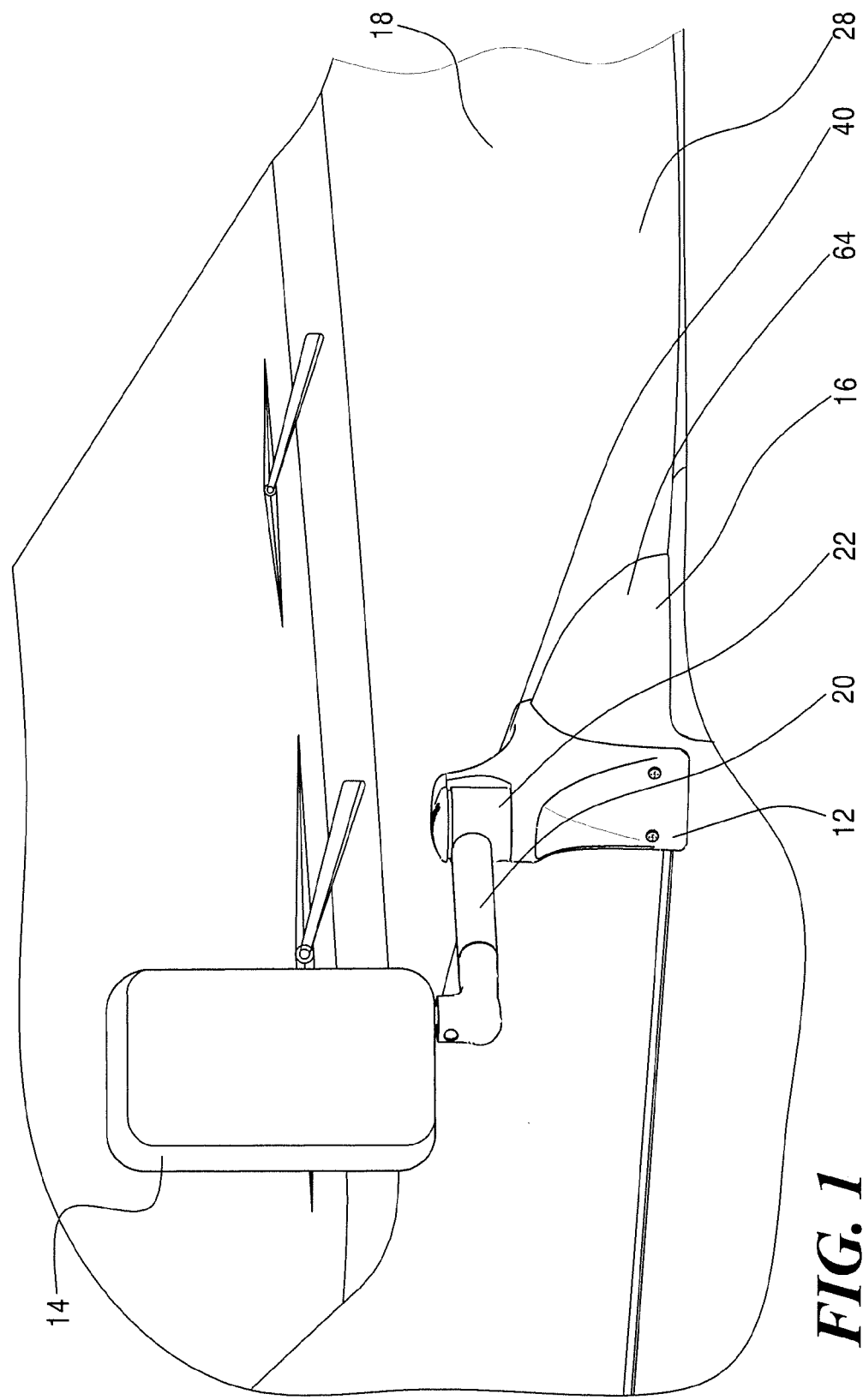
FIG. 1 shows a mirror mount that mounts a mirror to a fender of a vehicle.
Figure 2:
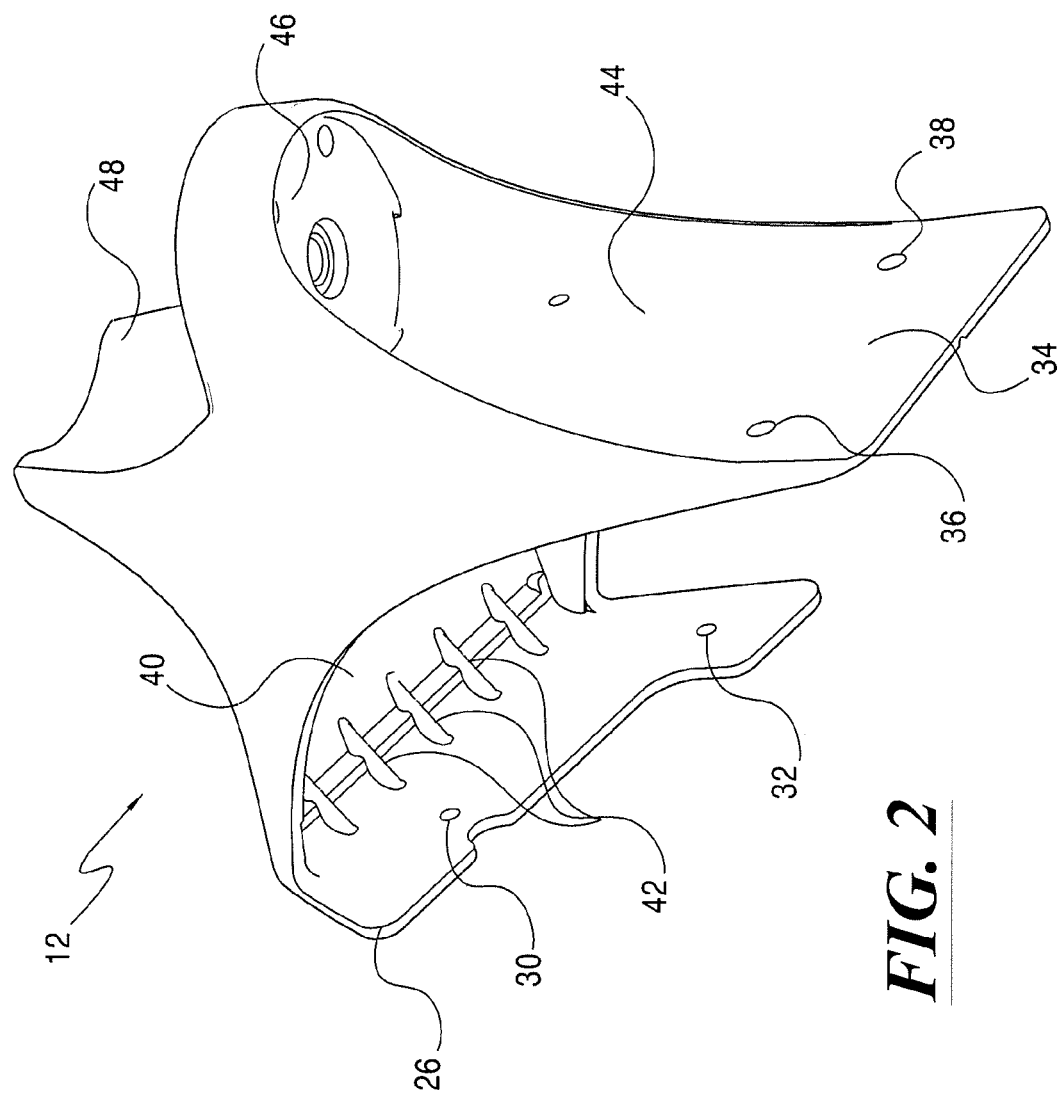
FIG. 2 is an isometric view of a base member of the mirror mount of FIG. 1.
Figure 3:
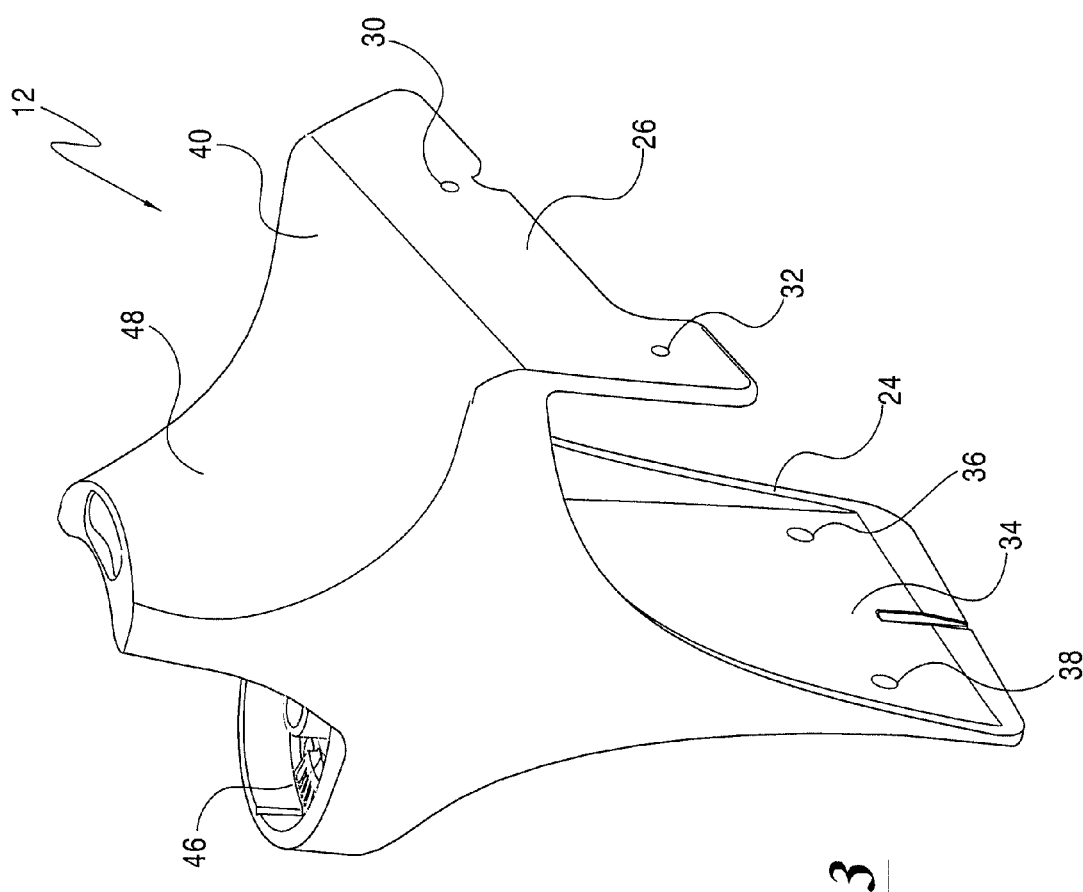
FIG. 3 is another isometric view of the base member of FIG. 2.
Figure 4:
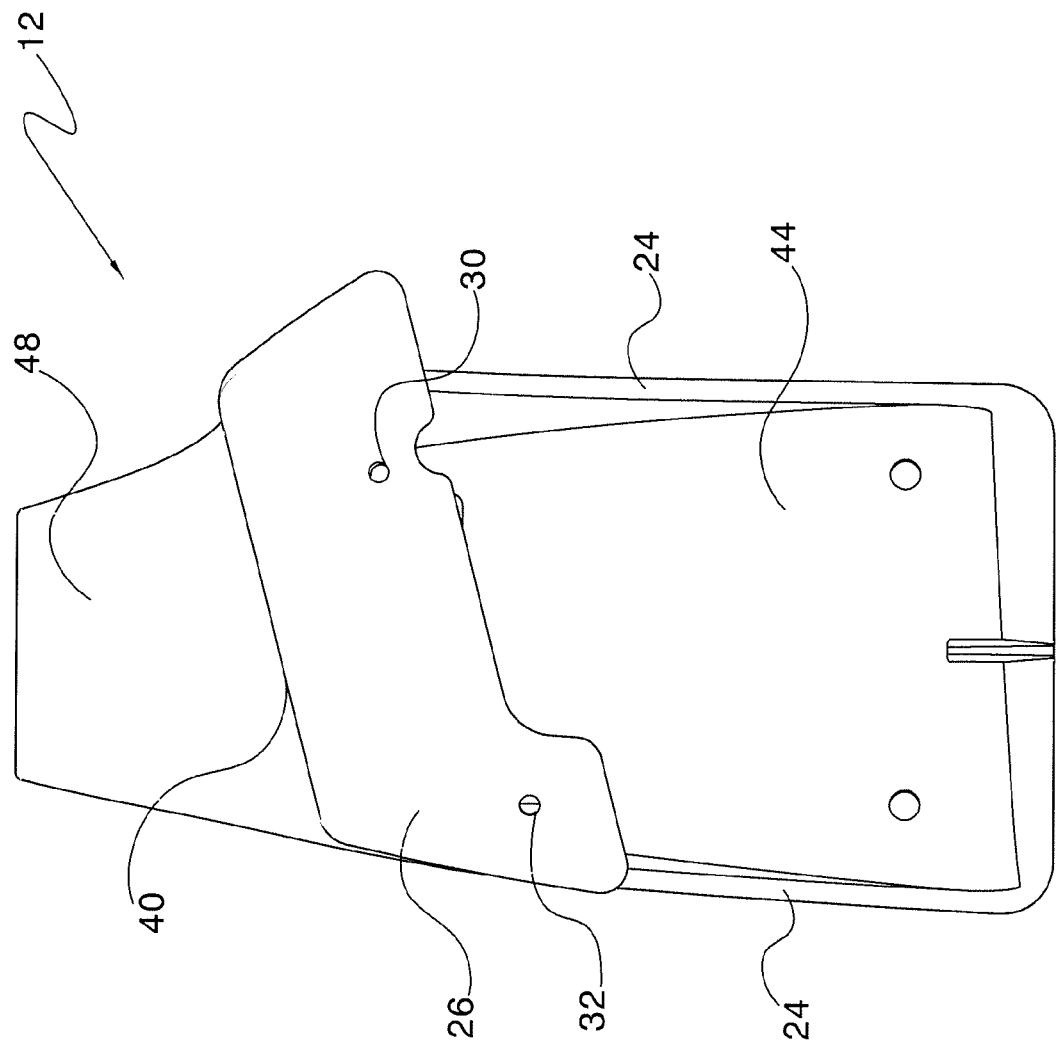
FIG. 4 is a back view of the base member of FIG. 2.
Figure 5:
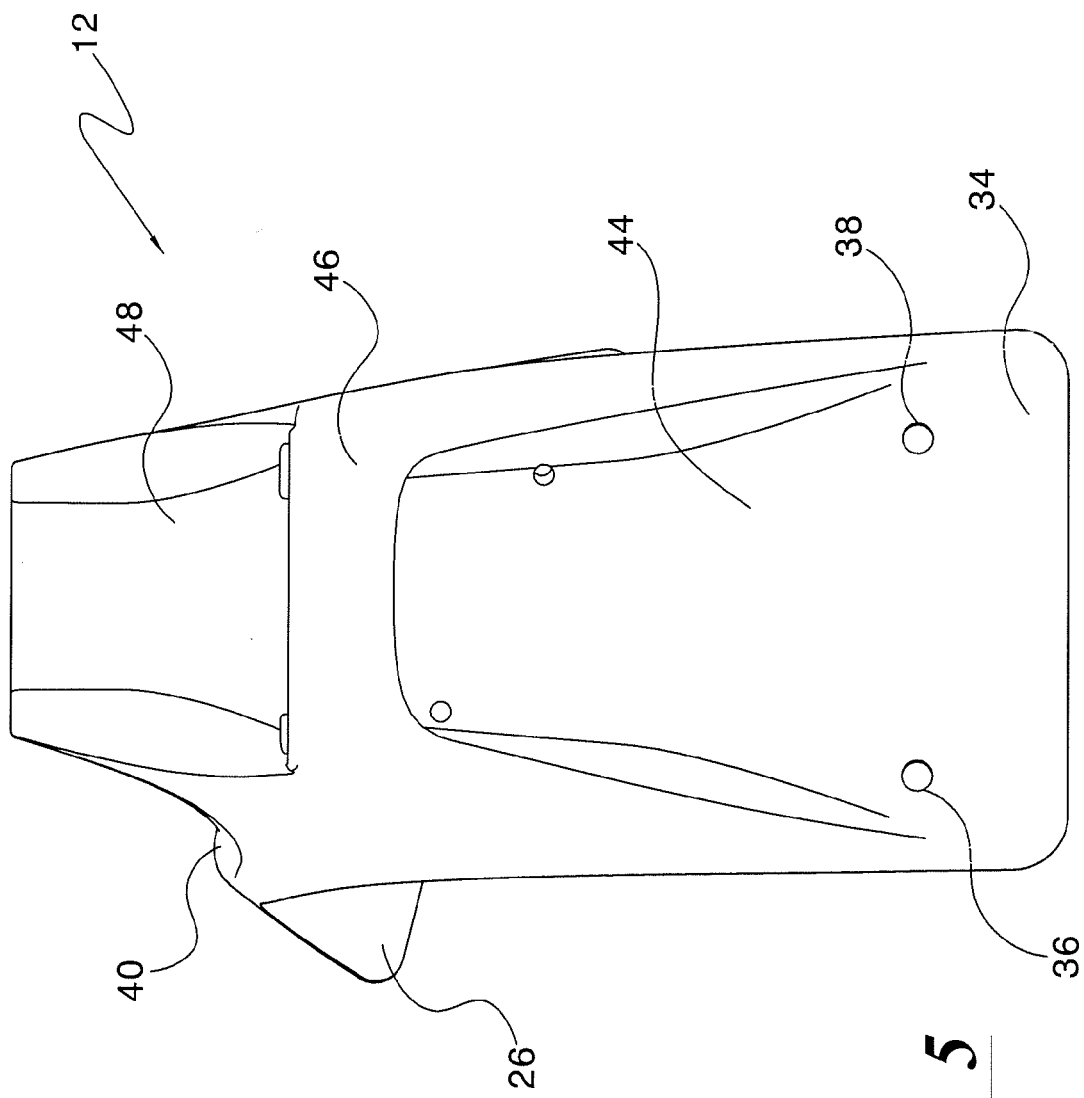
FIG. 5 is a front view of the base member of FIG. 2.
Figure 6:
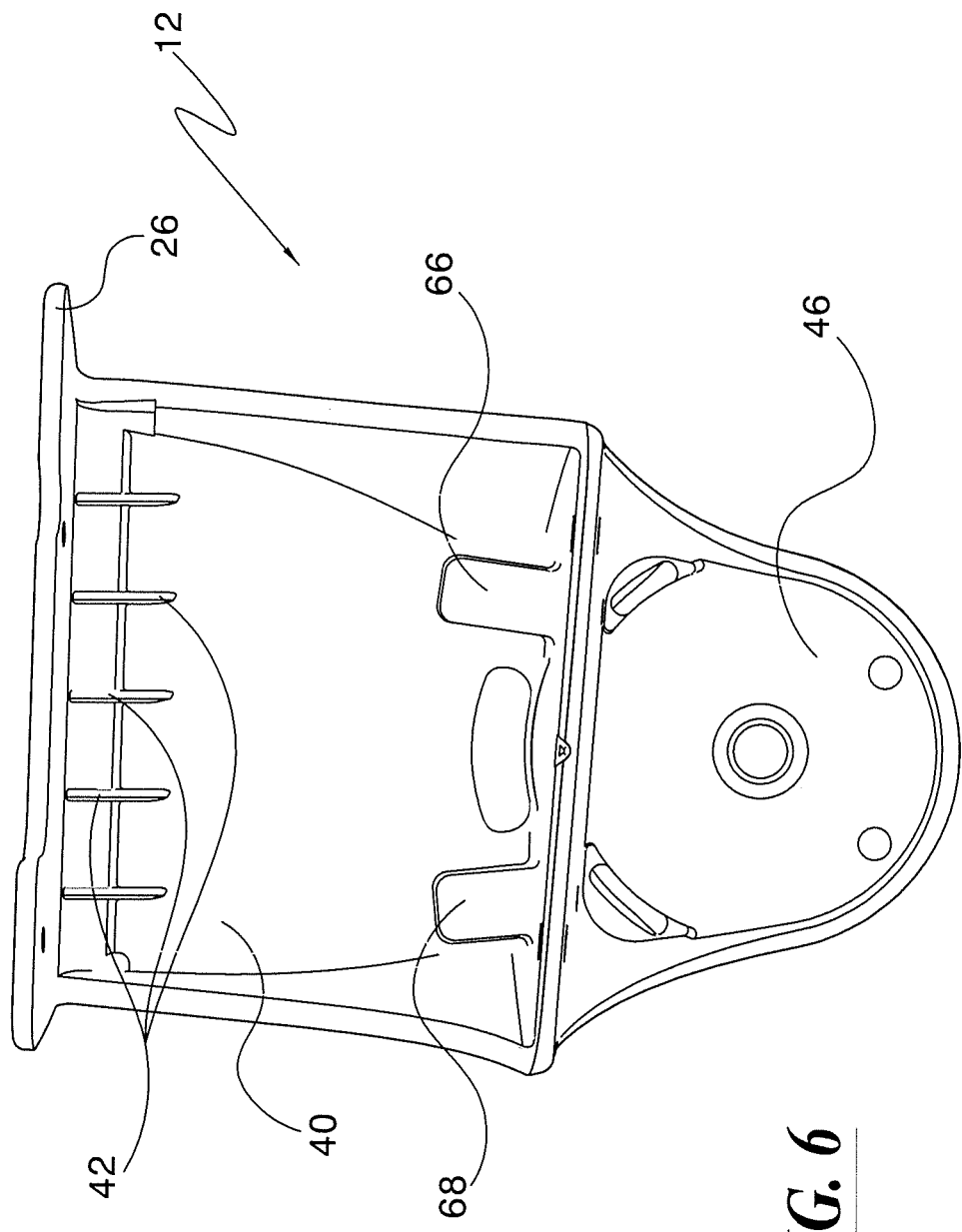
FIG. 6 is a bottom view of the base member of FIG. 2.
Figure 7:
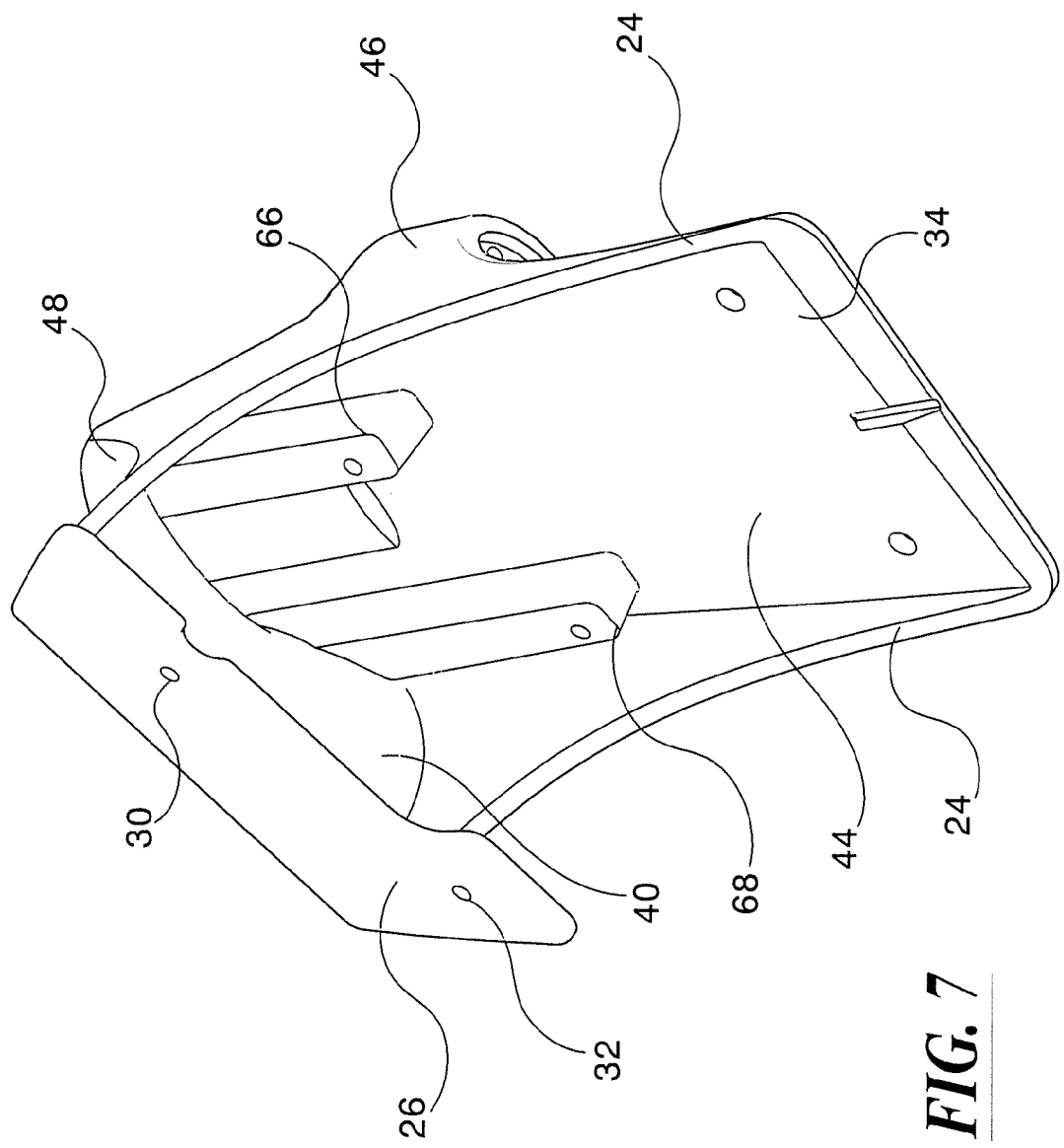
FIG. 7 is still another isometric view of the base member of FIG. 2.
Figure 8:
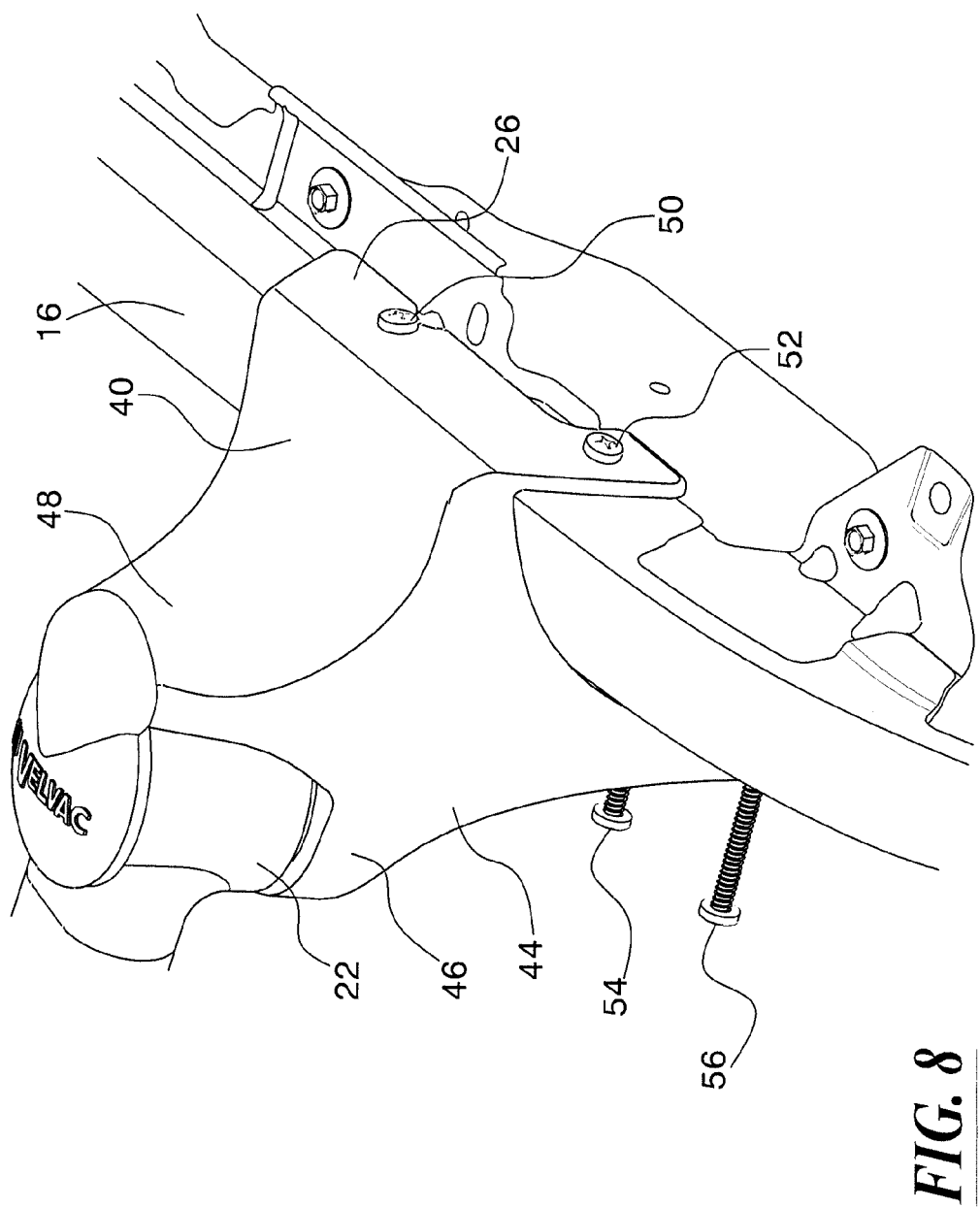
FIG. 8 is an isometric view showing the base member attached to a fender.

As shown in FIG. 1, a mirror mount 10 includes a base member 12 that mounts a mirror 14 to the fender 16 of a vehicle 18. A mirror support arm 20 has one of its end suitably fastened to the mirror 14 and another of its ends pivotally attached to the base member 12 by way of a pivot 22.

As shown in FIGS. 2-9, the base member 12 has an interior contour 24 that generally follows the profile of the fender 16 to hug the fender 16 when the base member 12 is applied to the vehicle 18. The base member 12 has an end 26 that extends into the compartment of the vehicle 18 under a hood 28 of the vehicle 18 between the hood 28 and the fender 16. The end 26 has holes 30 and 32 to receive fasteners such as screws or bolts to fasten the end 26 to the vehicle 18 as more fully explained below. Thus, when the base member is affixed to the fender 16, the end 26 extends generally in a downward, vertical direction and the holes 30 and 32 are generally horizontal.

The base member 12 has a further end 34 that extends down alongside the exterior of the fender 16. The end 34 has holes 36 and 38 to receive fasteners such as screws or bolts to fasten the end 34 to the fender 16 of the vehicle 18.

The base member 12 has a top portion 40 that rests on the top of the fender 16 and that is integrally formed with the end 26. The base member 12 includes ribs 42 that are formed between the end 26 and the top portion 40. The ribs 42 are reinforcing ribs that improve the stiffness of the mirror mount 10 over the known mirror mounts described above. The ribs 42 are integrally formed with top portion 40 and the end 26.

The base member 12 also has a side portion 44 that extends along the exterior of the fender 16 in a downward direction and generally closely profiles the exterior contour of the fender 16. The side portion 44 is integrally formed with the end 34 and the top portion 40.

The base member 12 includes a pivot support 46 that supports the pivot 22 attaching the mirror support arm 20 to the base member 12.

The pivot support 46 is integrally formed with the other portions of the base member 12 described herein so that the base member 12 is molecularly continuous. For example, the base member 12 may be a one-piece cast member.

The base member 12 has a neck 48 near the pivot support 46. The pivot 22 is suitably affixed to the pivot support 46 and pivots within the curvature of the neck 48 so that the mirror 14 can be pivoted between a viewing position as shown in FIG. 1 where the mirror 14 provides a rear facing view and a retracted position.

Figure 9:
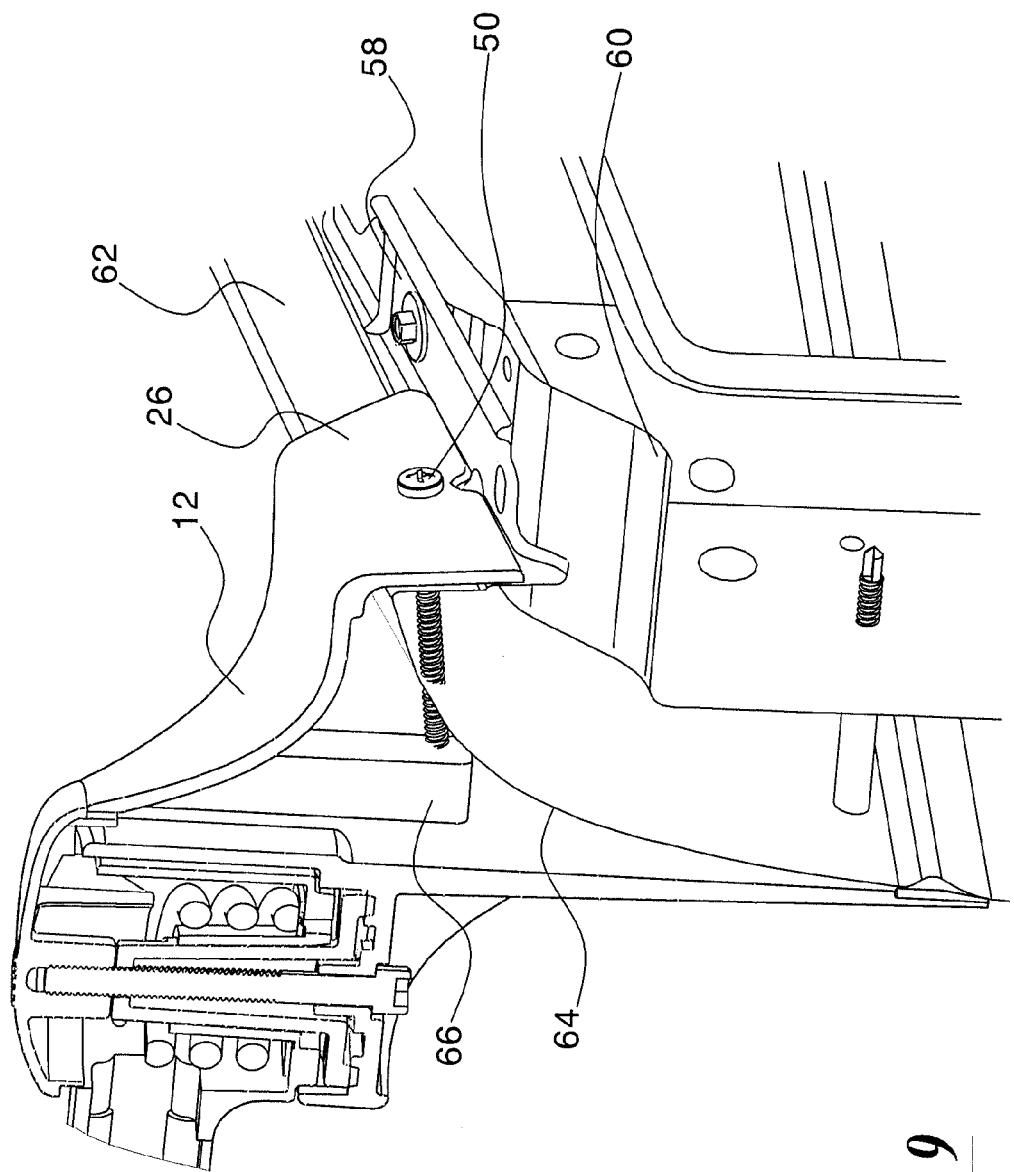
FIG. 9 is cut away view showing the attachment of the base member to a fender.
Figure 10:
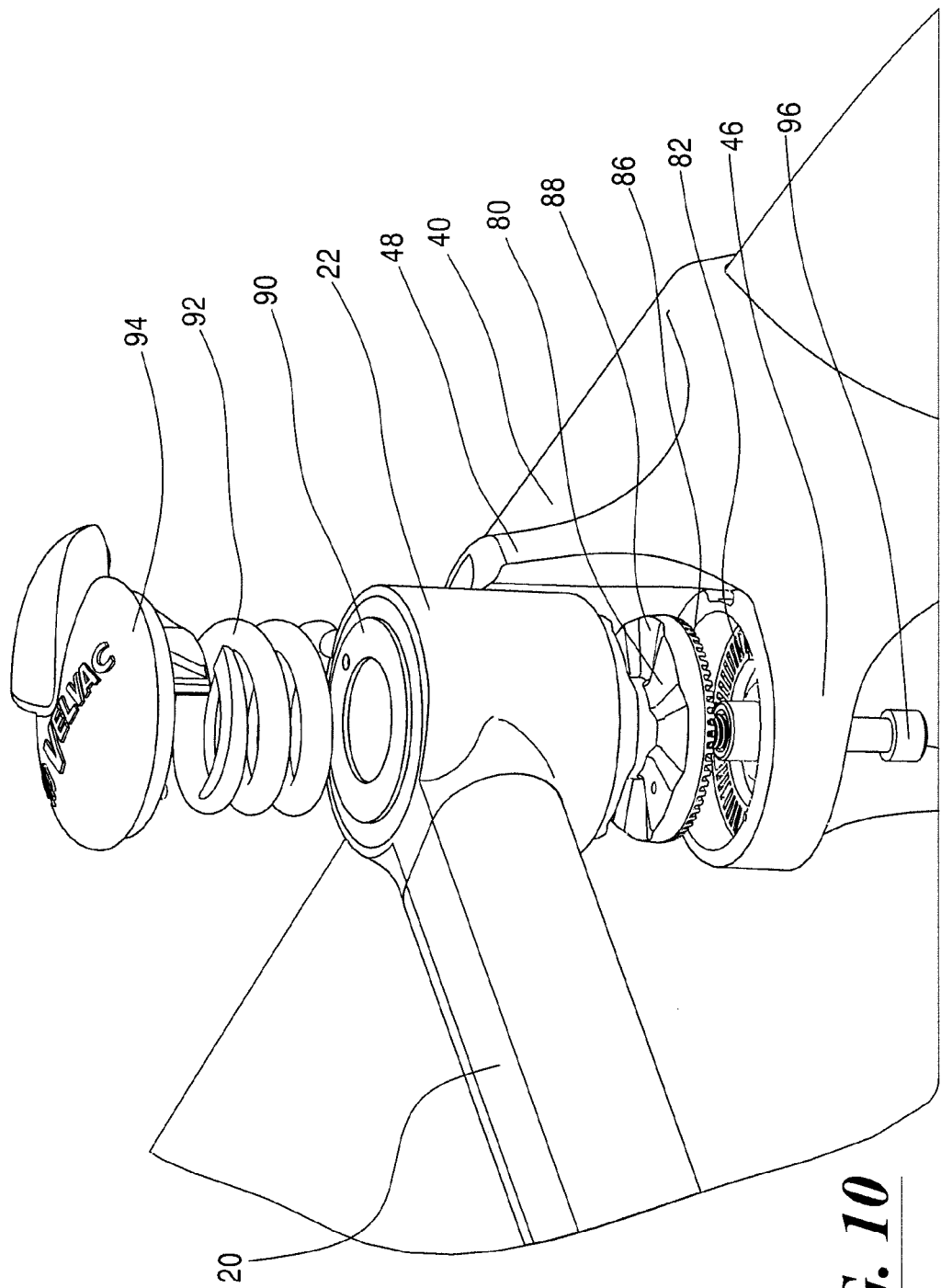
FIG. 10 illustrates an exploded view pivot assembly that mounts the mirror arm to the pivot support; and, FIG. 11 illustrates a cross section of the assembled pivot assembly.
Figure 11:
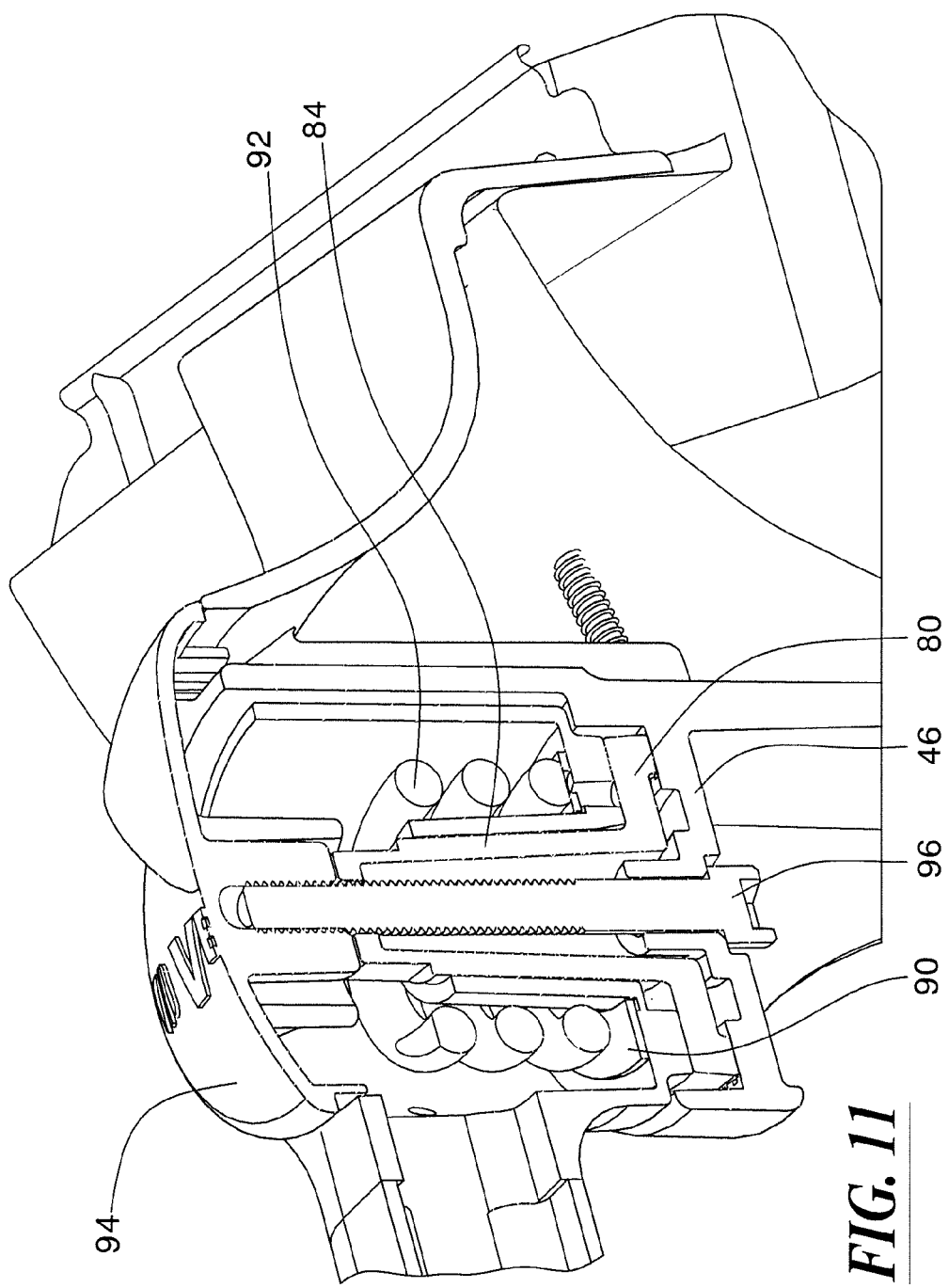

As shown in FIG. 9, the end 26 of the base member 12 extends between the fender 16 and the hood 28 and partially into the engine compartment of the vehicle 18. Screws or bolts 50 and 52 extend through the holes 30 and 32 in order to affix the end 26 of the base member 12 to the fender 16. Also, screws or bolts 54 and 56 extend through the holes 36 and 38 in order to affix the end 34 of the base member 12 to the fender 16.

As shown in FIG. 9, the fender 16 includes a generally horizontal portion 58 that is suitably screwed or bolted to a frame 60 of the vehicle 18 under the hood 28, a generally vertical portion 62 that extends alongside the hood 28 from the generally horizontal portion 58, and a curved exterior portion 64. The screw or bolt 50 is screwed or bolted through the generally vertical portion 62, through the curved exterior portion 64, and into a column 66 formed as an integral part of the base member 12. Although not shown, the screw or bolt 52 is similarly screwed or bolted through the generally vertical portion 62, through the curved exterior portion 64, and into a column 68 formed as an integral part of the base member 12. Thus, the screws or bolts 50 and 52 extend through the holes 30 and 32, through the two portions 62 and 64 of the fender, and into the columns 66 and 68 of the side portion 44 in order to affix the end 26 of the base member 12 to the fender 16.

In this manner, the base member 12 at the end 26 is clamped to the fender 16. This cross bolt feature provided by the screws or bolts 50 and 52 trap the fender 16 against the contour 24 of the base member 12 to strengthen and stabilize the fender 16 at the top portion of the base member 12. The one piece base member 12 closely profiles the fender 16. The reinforcing ribs 42 improves the stiffness of the base member 12 over current two piece designs to provide a rugged and stable mirror mount. The combination of the cross bolt feature and the one piece design of the base member 12 provide improved fender stability and, therefore, improved mirror stability and driver visibility over current two piece designs.

A pivot post 80 is assembled into a base 82 of the pivot support 46. The pivot post 80 includes a post 84, and a downwardly directed face 86, and an upwardly directed face 88. The downwardly directed face 86 and the base 82 include aligning serrated teeth. The serrated teeth of the downwardly directed face 86 and the base 82 align in a pre-determined orientation. This pre-determined orientation sets the pivot post 80 in its home position location and prevents rotation of the pivot post 80 when cycling with the mating of these teeth serrations. This pre-determined home position places the mirror support arm 20 and the mirror 14 in the proper viewing position. The serration teeth in both the pivot post 80 and the base 82, for example, may be equally spaced, such as every 6 degrees which would allow adjustment in 6 degree increments of the home position, if required.

The bottom of the pivot 22 and the upwardly directed face 88 include ramps that mate when the pivot 22 is placed over the post 84 of the pivot post 80, the mating ramps aligning for proper assembly position.

A wear washer 90 and a tension spring 92 are placed inside the pivot 22 so that the wear washer 90 and the tension spring 92 are placed concentrically over the post 84 of the pivot post 80. A coating of lubricating grease may be applied between the mating ramps of the bottom of the pivot 22 and the upwardly directed face 88 and may be applied at both ends of the tension spring 92 prior to assembly to minimize cycle rotation wear.

A pivot cap 94 is then placed on top of the tension spring 92 such that a pivot bolt 96 extends through the pivot support 46 and the pivot base 80 and is threaded into the pivot cap 94, which is tightened down on the pivot bolt 96 to an internal stop feature within a pre-determined torque range. This action compresses the tension spring 92 to produce proper force between the mating ramps of the pivot post 80 and the pivot 22.

Accordingly, the mirror support arm 20 and the mirror 14 can be rotated from the home position to the most forward or rearward positions, causing the ramps of the pivot 22 and the upwardly directed face 88 of the pivot post 80 to ride out and separate. When the mirror support arm 20 and the mirror 14 are rotated back to the original viewing position, the mirror support arm 20 will snap back into its original ramp alignment and home position.

Modifications of the present invention will occur to those practicing in the art of the present invention. Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A mirror mount that mounts a mirror to a fender of a vehicle comprising:
   a one-piece molecularly continuous base member having first and second ends, a side portion, a column, and a pivot support, wherein the side portion extends between the first and second ends, wherein the first end is generally vertical when the base member is affixed to a fender, wherein the first end is arranged to receive a generally horizontal first fastener that fastens the first end of the base member to the fender, wherein the side portion has a contour that generally follows an exterior profile of the fender and is generally vertical and the column extends along the side portion and is located between the side portion and the fender when the base member is affixed to the fender, wherein the first fastener extends through the first end of the base member, through two portions of the fender, and into the column when the base member is affixed to the fender, and wherein the second end receives a second fastener that fastens the second end of the base member to the fender;
   a mirror arm having one end to fasten to a mirror and a second end; and,
   a pivot fastened to the pivot support and to the second end of the mirror arm to permit the mirror arm to pivot with respect to the base member.

2. The mirror mount of claim 1 wherein the base member includes a neck that has a contour matching a contour of the pivot.

3. The mirror mount of claim 1 wherein the base member includes reinforcing ribs that reinforce the first end.

4. The mirror mount of claim 3 wherein the base member includes a top portion between the first end and the side portion, and wherein the reinforcing ribs extend between the top portion and the first end.

5. The mirror mount of claim 1 wherein the first and second fasteners comprise one or more of the following: screws and bolts.

6. A mirror mount that mounts a mirror to a fender of a vehicle comprising:
   a one-piece molecularly continuous base member having first and second ends, a side portion, a column, a reinforcement, and a pivot support, wherein the side portion extends between the first and second ends, wherein the first end is generally vertical when the base member is affixed to a fender, wherein the first end is arranged to receive a generally horizontal first fastener such that the first fastener passes through the first end, passes through two portions of the fender, and extends into the column so as to fasten the base member to the fender, wherein the side portion has a contour that generally follows an exterior profile of the fender and is generally vertical and the column extends along the side portion and is located between the side portion and the fender when the base member is affixed to the fender, wherein the second end receives a second fastener that fastens the second end of the base member to the fender, and wherein the reinforcement reinforces the first end;
   a mirror arm having one end to fasten to a mirror and a second end; and,
   a pivot fastened to the pivot support and to the second end of the mirror arm to permit the mirror arm to pivot with respect to the base member.

7. The mirror mount of claim 6 wherein the base member includes a neck that has a contour matching a contour of the pivot.

8. The mirror mount of claim 6 wherein the reinforcement comprises reinforcing ribs that reinforce the first end, wherein the base member includes a top portion between the first end and the side portion, and wherein the reinforcing ribs extend between the top portion and the first end.

9. The mirror mount of claim 6 wherein the first and second fasteners comprise one or more of the following: screws and bolts.

10. A mirror mount that mounts a mirror to a fender of a vehicle comprising:
   a one-piece molecularly continuous base member having first and second ends, a side portion, a column, and a reinforcement, wherein the side portion extends between the first and second ends, wherein the first end is generally vertical when the base member is affixed to a fender, wherein the first end is arranged to receive a generally horizontal fastener such that the fastener passes through the first end, passes through two portions of the fender, and extends into the column so as to fasten the base member to the fender, wherein the side portion has a contour that generally follows an exterior profile of the fender and is generally vertical and the column extends along the side portion and is located between the side portion and the fender when the base member is affixed to the fender, and wherein the reinforcement reinforces the first end; and,
   a mirror arm arranged to fasten a mirror to the base member.

11. The mirror mount of claim 10 wherein the reinforcement comprises reinforcing ribs that reinforce the first end, wherein the base member includes a top portion between the first end and the side portion, and wherein the reinforcing ribs extend between the top portion and the first end.

12. The mirror mount of claim 10 wherein the fastener comprises one of a screw and a bolt.

13. The mirror mount of claim 10 wherein the base member includes a neck that has a contour matching a contour of the pivot.

14. A mirror mount for mounting a mirror to a fender of a vehicle, the mirror mount comprising:
   a one-piece base member comprising: a first end generally vertical when the base member is affixed to the fender; a side portion having a contour that generally follows an exterior profile of the fender; and a column extending along the side portion and located between the side portion and the fender when the base member is affixed to the fender, wherein the first end is configured to receive a fastener, the fastener passing through the first end, through the fender, and into the column to fasten the base member to the fender; and,
   a mirror arm arranged to fasten a mirror to the base member.

15. A mirror mount for mounting a mirror to a fender of a vehicle, the mirror mount comprising:
   a one-piece base member comprising: a first end generally vertical when the base member is affixed to the fender; a side portion having a contour that generally follows an exterior profile of the fender; and a column extending along the side portion and located between the side portion and the fender when the base member is affixed to the fender;
   a fastener passing through the first end, through the fender, and into the column to fasten the base member to the fender; and,
   a mirror arm arranged to fasten a mirror to the base member.

* * * * *